United States Patent
Daansen et al.

(10) Patent No.: US 6,375,038 B1
(45) Date of Patent: Apr. 23, 2002

(54) DISPENSER HAVING TIMING MEANS, MULTISENSORY OUTPUT AND MEANS OF TRACKING USAGE NUMBER

(75) Inventors: Warren S. Daansen, Nashua; Allan G. Hock, Londonderry, both of NH (US)

(73) Assignee: Daansen USA, Inc., Nashua, NH (US)

( * ) Notice: Subject to any disclaimer, the term of this patent is extended or adjusted under 35 U.S.C. 154(b) by 0 days.

(21) Appl. No.: 09/591,751

(22) Filed: Jun. 12, 2000

Related U.S. Application Data

(60) Provisional application No. 60/161,953, filed on Oct. 28, 1999.

(51) Int. Cl.[7] .............................................. B67D 51/08
(52) U.S. Cl. ........................ 222/52; 222/39; 222/638; 222/639; 222/651; 340/573.1; 434/169
(58) Field of Search ............................ 222/39, 52, 638, 222/639, 644, 651; 434/236, 237, 238, 247, 258, 118, 308, 365, 169; 340/309.15, 573.1; 387/120

(56) References Cited

U.S. PATENT DOCUMENTS

| | | | | |
|---|---|---|---|---|
| 3,647,115 A | * | 3/1972 | McCann et al. | 222/39 |
| 4,535,813 A | * | 8/1985 | Spain | 137/625.5 |
| 4,606,085 A | * | 8/1986 | Davies | 4/623 |
| 4,896,144 A | * | 1/1990 | Bogstad | 340/691 |
| 5,808,553 A | * | 9/1998 | Cunningham | 340/573 |
| 5,824,407 A | * | 10/1998 | Hayashi et al. | 428/318.8 |
| 5,870,015 A | * | 2/1999 | Hinkel | 340/573 |
| 6,038,331 A | * | 3/2000 | Johnson | 382/100 |
| 6,065,639 A | * | 5/2000 | Maddox et al. | 222/36 |
| 6,236,317 B1 | * | 5/2001 | Cohen et al. | 340/573.1 |

* cited by examiner

*Primary Examiner*—John Kwon
*Assistant Examiner*—Frederick C Nicolas
(74) *Attorney, Agent, or Firm*—Scott J. Asmus; Vernon C. Maine

(57) ABSTRACT

The invention in the simplest form is a dispenser that is a teaching tool and uses audio and visual means to promote compliance with proper washing techniques. A detection means is used to commence a time interval, and washing instructions are used to communicate with the user as an instructional tool in washing. There is a feedback response during the washing cycle to walk the user through the washing cycle and provide progress indicators during the cycle. A usage indicator tracks the number of usages as part of a management tool of assessing overall employee performance.

17 Claims, 3 Drawing Sheets

DISPENSER HAVING TIMING MEANS, MULTISENSORY OUTPUT AND MEANS OF TRACKING USAGE NUMBER

CROSS REFERENCE TO RELATED APPLICATIONS

This application claims priority to U.S. patent application 60/161,953 filed on Oct. 28, 1999, which is incorporated herein by reference.

BACKGROUND OF THE INVENTION

1. Field of the Invention

The present invention relates to an improved dispensing apparatus. More particularly, a dispenser that incorporates a timing means in conjunction with audio and visual output to assist the user in proper washing techniques for compliance with recommended guidelines and to monitor the number of usages.

2. Background Art

Each year, millions of reported illnesses and serious infections are attributable to improper hand washing. The unreported cases are estimated to be much higher. Food borne illness kills over 10,000 people each year, and 70% of the outbreaks originate in food service sector. The passage of viral and bacterial contaminants result from physical contact with an infected source and are carried from one site to another with each successive physical contact.

The problem is most evident in hospital and related medical establishments, as well as those businesses associated with preparing and distributing food and food products. A person that handles a single contaminated source will spread the contaminant to every person, article and surface touched by that person. The subsequent contaminated sources represent additional contamination sites that spread the contaminant. The liability of contamination or illness caused by inadequate washing techniques is very high. And, a single food borne illness can tarnish a long-standing reputation and wreak financial havoc.

Proper washing of hands has been demonstrated to kill the contaminants and prevent the spread of disease and contaminants. According to the Centers for Disease Control, proper hand washing is the single most important process in preventing the spread of the pathogens. Microbial contamination refers to microscopic organisms, especially any of the bacteria that cause disease, e.g.: germs. A germ is the rudimentary form in which a new organism is developed, and encompasses any microscopic organism and any one of the bacteria that can cause disease. A bacterium is typically a one-celled microorganism, wherein some cause diseases such as pneumonia, tuberculosis, or anthrax while other bacteria are necessary for fermentation and nitrogen fixation.

Some industries are much more sensitive to proper washing techniques. Restaurants are particularly prone to the dissemination of food-borne contaminants and the U.S. Food and Drug Administration (FDA) has specific guidelines articulated in the Food Code. The Food Code has several sections that address the washing of hands for food service and related personnel. According to the Food Code regulations, a person must wash after using the bathroom, sneezing, coughing, using a disposable tissue, using tobacco, eating or drinking, handling soiled utensils, and when switching from raw foods to ready-to-eat foods, and any other activity that potentially contaminates the hands.

In addition, the Food Code describes a proper hand washing technique as lasting at least 20 seconds, washing up to the forearms, and a special emphasis on between the fingers and underneath fingernails. In addition to timing the washing, it is important to consider the different steps in the washing procedure. A proper washing cycle commences with combining water and soap and scrubbing the hands vigorously. There are various soaps or cleansing liquids that can be used, preferably having anti-bacterial or anti-microbial properties. Nails should be cleaned and scrubbed. After scrubbing, the hands should be thoroughly rinsed with water. The areas between the finger and underneath the fingernails should be specifically cleaned and checked.

The regulations also require a supervisor ensure compliance with the regulations and promote the effective washing protocols. Employers may be fined or lose licenses if employees do not observe these regulations, and such employees are likely to lose their employment.

Although there may not be specific codes governing all industries and circumstance, it is common sense that adherence to the regulations will instill a safer environment for all. And, in a litigious environment, adhering to a strict standard is also a cost-effective and practical measure. There are varying international standards for the washing of hands, but in general, the U.S. standard provides a reasonable approach to follow.

Unfortunately, the proper washing guidelines are not regularly and rigorously followed. Many food service personnel do not appreciate the significance of proper washing. The restaurants rarely provide adequate training to the personnel, and seldom encompass sufficient supervision during the work shifts. In addition, the employees at restaurants and dining establishments tend to be lower paid and may not care or understand the posted written guidelines, especially if the guidelines are in an unfamiliar language. Presently there is no adequate means of providing proper guidance and instruction during washing, no system designed to walk a user through the washing steps, and no simple means of monitoring or tracking employee washing.

Contributing to the problem of inadequate washing is the lack of formal education by those in the food services segment, the low pay scale, and the periods of rushed food preparation. These factors all contribute to a potential for poor washing conditions. Due to the many illnesses caused by food preparation, the FDA continues to apply more formal regulations and guidelines for employers regarding proper washing skills. Employers are demanding a better system of aiding and monitoring employee washing habits.

The soap and liquid compounds for hand washing come from a number of different dispensers available in the marketplace. Liquid and semi-liquid dispensers are used in numerous applications and are used to dispense metered portions of cremes, lotions, gels, soaps, anti-bacterial cleansing liquids, anti-microbial cleansing liquids, and similar materials. A typical dispenser allows the user to obtain a specific amount of liquid matter with minimal ease. Manual and semi-automatic dispensing systems are common in the industry, and automated dispensers are beginning to enter the marketplace.

The manual dispensers utilize levers and other mechanical assemblies wherein the user must provide some physical contact with the unit in order to dispense the liquid. The physical contact in manipulating the lever does provide a contact with a surface that is typically wet and dirty, and may harbor contaminants. Automated dispensers are becoming more popular, and operate with a variety of electrical and electromechanical components to automatically dispense the liquid after triggering some sensory input. The automatic or 'touchless' dispensers do not require any physical contact with the dispenser.

Unfortunately, the touchless dispensers are fairly expensive and require fairly complex electrical and electrical components in order to function. Besides electronic equipment, there are mechanical components such as plungers and gear trains that work in conjunction with the electronics. The mechanical gears draw substantial energy during the 'pinch and squeeze' operation to deliver liquid cleanser, requiring frequent battery replacement. In addition, if the batteries are drained, the electrical elements are not functioning properly, or the mechanical functions are broken, the entire unit is disabled and will not dispense any liquid cleansers. The low reliability and the catastrophic failure mode are a major concern in the touchless dispenser market.

Within the field of liquid dispensers, there are many types of dispensers. The most common and cost effective is the bag-in-box system, where the liquid comes in a no-leak pouch with pump tip and is disposable. This system is a closed system, and all the air is removed from the pouch during manufacturing. The bag collapses upon itself once the liquid is evacuated, minimizing waste disposal. The closed system has many advantages, including being a more sanitary system. The standard size pouch is 800 ml, but other sizes are in use, including 500 ml to 900 ml. It is a necessary requirement that the cost to produce a disposable pouch be kept to a minimum, while still delivering consistent results. The dispensers are installed in many public facilities, and are subject to extreme wear and tear. Due to the excessive use, the devices must be robust and relatively maintenance free.

Other dispensers use cartridges or refillable containers. The cartridges must be pierced, are generally not refillable, and produce greater waste. Both cartridges and refillable containers introduce air into the system, aiding the production of bacteria and mold. The cost and administrative complexity in using these other forms of dispensing liquids, as well as the decreased sanitary conditions limit their market appeal. Also, these semi-automatic and automatic systems can be designed to complete the cycle, metering exactly the correct amount of liquid, independently of successive and rapid pushes of the actuating member that frequently occur.

The liquid soap industry has numerous brands and categories of cleansing liquids. The viscosity and particulate content are also subject to extreme variations. There is an array of particulate matter that can be added to cleansing liquids to form a grit soap compound that is more effective in cleaning. The most common grit material is plastic microspheres, although other materials such as clay, walnut shells and corn cobs have also been used. Besides the variations of compounds used to form grit soap, the size of the grit also varies.

There has also been a consumer demand for anti-microbial cleansing liquids and anti-bacterial cleansing liquids, and the industry has reacted by adding creating new compounds with these properties. These anti-microbial and anti-bacterial cleansing liquids are available with or without grit and have certain characteristics and viscosity differences as compared to standard liquid soap. Besides liquid soap, other compounds dispensed include body and hair shampoo, hand creme solutions, lotions, cleansing liquids, and shaving creme.

In a typical bag-in-box operation, a user depresses a lever or controller. This applies pressure to the dispenser tube that creates a vacuum in the collapsible pouch that exerts fluid pressure against the ball in the ball check valve. If the pressure is sufficient, the ball is displaced, and the liquid flows around the ball and into the ball check valve chamber. The liquid flows into the space between the spring and the interior wall of the ball check valve chamber. Once the chamber is sufficiently full, the liquid is forced through the compressed spring and out through the lower fitment hole and through the nozzle.

The transition from a user applying purely mechanical forces to meter out some liquid to a semi-automated or automated dispensing unit is appealing to the industry and the public. Soap dispensers tend to become dirty and wet during frequent use, and users are reluctant to touch such units. The wet dispensing units also harbor germs and microbes that could be transferred to the next user, especially is the user does not wash properly. If washed properly, all contaminants should be removed during the subsequent washing.

There is growing trend for dispensers that do not require a manual touching due to bacteria and microbial contamination. Touchless dispensers are well known in the prior art and incorporate various means to detect when a user is ready to receive the cleaner from the dispenser. Semi-automatic and automatic systems are designed to complete the cycle, metering exactly the correct amount of liquid, independently of successive and rapid pushes of the actuating member. Additionally, the user no longer has to touch the wet and often dirty dispenser. Unfortunately, many of the touchless dispensers are expensive devices that are prone to electrical and mechanical failures as well as constant battery replacement. Once a touchless dispenser loses power or has some mechanical or electronic failure, the entire unit is inoperable and will not dispense liquid cleanser. And, even using a touchless dispenser and metering the proper amount of liquid cleaning agent does not guarantee that the user will employ proper washing techniques.

In order to reduce the aforementioned problems, attempts have been made to produce an improved dispensing system. The prior art systems have general shortcomings and do not adequately address the aforementioned problems. Most generally, the prior art dispenser systems do not provide any instructions or timing for a recommended washing cycle, there is no progress indication, usage numbers are lacking, and there are general reliability problems.

The invention of U.S. Pat. No. 5,810,201 ('201) provides some interaction between the dispenser and the user, such as a greeting or music when the user is proximate to the dispenser. This device is not intended to aid in compliance with the recommended washing protocol nor does the '201 invention encompass any timing means for the washing process. There is no number of usages for tracking purposes and no progress indicators for the user to follow during the washing cycle.

A timed washing dispenser is described in U.S. Pat. No. 5,771,925 ('925) that detects the dispenser usage and activates a timing circuit and counts for the recommended washing cycle. There is audio means to signal the start and stop of the washing sequence.

One approach to aid in hand washing compliance is shown in U.S. Pat. No. 5,793,653 ('653). This complex monitoring system embodies several monitoring and data collection points. The '653 system is intended to track employee hand washing usage and allow supervisor collection of data to check compliance. Another compliance-oriented invention is described in U.S. Pat. No. 5,945,910 ('910) that shows a monitoring module that operates in conjunction with the dispenser to track employee usage and to provide a means of checking the data for compliance.

An all-encompassing system in shown in U.S. Pat. No. 5,765,242 ('242), wherein the water lines and a dispenser coordinate the washing and drying cycle. Soapy water is dispensed in the washing phase, rinsing water is dispensed in the rinse cycle, and finally the drying unit is actuated to dry the hands. A timer activated toilet bowl cleaner is disclosed in U.S. Pat. No. 5,611,465 that uses an automated timer to release cleaner into the toilet bowl.

Although the prior art discusses a start and stop signal for washing, it does not provide proper washing instructions or reminders to the user as an aid in compliance with recommended washing regulations. There is no progress indication to walk the user through the washing cycle to indicate the different steps of washing, such as lathering, scrubbing and rinsing. Finally, there is no simple tracking means for number of usages so that a supervisor can check the usage number and clear the usage number without generating a complex paper trail. Employees and supervisors are more likely to use and utilize a system that does not place undue hardship or difficulty in operation of the dispenser.

What is needed is a dispenser system that not only meters out the proper amount of liquid soap, but aids the user in complying with proper washing techniques. Such a system notifies the user via audio, visual, or a combination of audio/visual means of the industry acceptable washing intervals. Not only should the device alert the user as to the start and stop of the washing cycle, but it shows the progress of the cycle and provides instructions to the user. Such a device instructs and reminds the user of the steps in washing to aid in promoting compliance with the suggested and recommended guidelines. An overall aspiration is to produce a high reliability dispenser with few moving parts, and wherein a failure will not prevent the liquid cleanser from being dispensed. The design must also be cost effective to manufacture and implement, and allow for easy incorporation into current dispenser designs.

A further embodiment should make the dispenser more sanitary by employing anti-microbial and anti-bacterial properties into the dispenser plastic housing to reduce the contamination of dispensers requiring a manual or semi-manual engagement. Employing such contamination resistant plastic lowers the potential for spreading pathogens and allows employers to use the less expensive and more rugged mechanical dispenser designs without incurring any increase in the likelihood of spreading contaminants.

SUMMARY OF THE INVENTION

The present invention has been made in consideration of the aforementioned background. An object of the invention is to provide a dispenser system that aids in compliance with proper hand washing by instructing the user during the washing cycle. The voice instructions operate in conjunction with the recommended timing interval and coach the user on the various steps, three steps in the preferred embodiment, lathering, scrubbing, and rinsing. The multi-part voice instruction messages coach the user in the proper steps of washing and serve as reminders as well as a teaching tool for users.

A related object is a system of teaching employees the proper method of hand washing. Employees are given orientation or introduction to the dispenser of the present invention and the aural messages and visual feedback teach the user how to wash and the correct duration of washing. A user that follows the simple lesson will learn proper washing protocol, and decrease the likelihood of contamination as well as lowering liability for damages.

Another related object of the invention is to employ customizable instruction messages aimed at the specific target audience. Different languages, different speakers, and different wording can be used to optimize the washing for the particular target audience. Voices of characters or celebrities could be used to provide the instructions. Alternatively, voice instructions can be customized by the supervisor to include instructions specific to the bathroom facility or intended user.

Yet another object of the invention is to employ visual feedback during the washing. The voice instructions at each step are coordinated with visual signals that show the user the progress through the washing cycle. Such progress walks the user through the process and has a psychological incentive to complete the entire washing cycle. Multiple LED's can be arranged to track the progress by using different colors such as green, yellow and red as the user progresses through the washing cycle. A line of LED's could illuminate one at a time in procession every few seconds such as a countup. Alternatively, all the LED's could be illuminated at the initiation of the sequence, and count off one by one until the countdown is completed. The feedback characteristic incorporates a continuous indication of time elapsed or remaining time to show the user the progression and allows the user to better manage the time. An LCD display can show a clock that counts up or down for the washing cycle.

A related feedback object of the invention is to employ electronics and include a microprocessor to provide customizable feedback, such as modulation of sound or visual signals to the user. The customizable feedback can include increasing frequency of beeps, raising the tone, blinking the displays differently through the cycle, or a count down time display. The feedback indicates where the user is in the cycle and encourages him/her to complete the cycle during the washing period and alert user when the time interval is completed.

An object of the invention is to provide a means of tracking the number of usages of the dispenser over a given time period. As a management tool, a supervisor needs to be able to approximately track whether the employees are washing their hands. The supervisor can obtain a simple approximation by tabulating the number of employees during a given shift and the length of time of the shift. Although the supervisor will not be able to identify which employees washed, he will be able to ascertain gross violations of protocol and respond accordingly.

A related object includes where the compliance can be monitored by the supervisor by accessing the microcontroller of the present invention and getting the number of usages. The access may be voice actuated, keypad, badge code, magnetic key or any other accessing means. In a preferred embodiment the supervisor uses a magnetic key to obtain dispenser count information as well as to reset the dispensers or customize the operation. The information can be displayed on an LCD or otherwise communicated, but in the preferred embodiment the number of usages is communicated verbally by the dispenser system. The magnetic key in conjunction with the Hall sensor yield a non-invasive method of quickly retrieving the number of usages. The dispenser does not need to be opened to read a counter and the number is not otherwise displayed on the dispenser. Rather, the supervisor swipes the magnet key and is quickly told the count number, And another object is an LCD display provides text or images to assist in the washing process. The instructions could be displayed in conjunction with the audio instructions for the hearing impaired and comply with the various disability acts and requirements. Images could be shown depicting the various stages such as lathering, scrubbing as a means of communicating the information in a manner that is understandable by persons, even if the instruction language is unknown to the user.

Another object is to use verbal instructions for the washing sequence interspersed with music or silence rather than a complete verbal instructional message. The instructional message is broken into three steps in the preferred embodiment-lathering, scrubbing, and rinsing. An additional step of inspecting can be included in the instructions. Each step lasts a certain time interval and in a preferred embodiment, the lathering step takes approximately 8 seconds, the scrubbing step takes 7 seconds, and the rinsing step takes 5 seconds—for a total of 20 seconds.

An additional object is to provide for different time intervals and steps depending upon the industry or application. Certain sectors, such as nursing homes or health clinics, may require a longer washing cycle with additional steps for sterilization. The microcontroller can be pre-programmed in the factory with the appropriate messages or the user can configure the dispenser by customizing the time and/or messages.

Another object of the invention is to employ further electronics to play music or advertisements during the washing period. Such audio output can be interspersed around the voice instructions. Another object is to incorporate modulating patterns to indicate the timing position within the washing interval. The modulating patterns consist of tones that beep in an increasing frequency and can incorporate a visual flashing pattern in conjunction with the audible tones. In versions with a speech synthesizer, a numeric countdown or countup can instruct the user in the washing cycle.

Additional instructions are within the scope of the invention, and may include instructions on drying hands or inspecting hands. Additionally, the audio output may include advertisements or promotions to the user. As a captive audience, the audio output in the dispenser is an effective marketing tool. Such advertisement may promote a particular event or product.

A related object is to provide for randomization of each washing cycle step to prevent the messages from being mundane. Not only are the messages customizable, but the frequency or repetition can be set to occur at different pushbar requests. For example, the LED's can continue to be employed, but the voice instructions can be played every fifth time, or every fifth time on average. A further implementation is to have the average duty cycle of voice messages get smaller with realtime, number of usages, or number of supervisor resets, and revert to a new average value. For example, the average duty cycle of voice messages will decrease to every third time and continue to become less frequent over time, number or usages or resets. If the supervisor notes a decrease in usage numbers, the dispenser can be reset to again play voice instructions every actuation.

Further objects include a dispenser, whereby the system provides audio guidance to proper washing intervals for the visually impaired. The instructions can aid those with visual difficulty in properly washing and provide other information specific to the facility.

Yet a further object is incorporating a means of actuating the sequence. In a preferred embodiment, a Hall effect sensor is triggered each time the pushbar containing a magnet is actuated to dispense liquid cleansers. The sensor can trigger the start of the washing process, and also serve to track the number of usages of the individual actuations of the lever bar. Hall effect sensors are well known in the art and are triggered by introducing a magnetic field in close proximity to the sensor.

And yet one further object is to monitor the amount of liquid cleanser in the dispenser by keeping track of the usages number. By knowing the amount of liquid in the dispenser and the amount metered out on each application, a simple processor calculation can approximate the amount of liquid and the remaining number of usages. An appropriate message can be communicated to ensure the dispenser is always adequately filled.

An object of the invention is to provide an actuation means such as a mechanical plunger, magnetic sensor, or spring assembly to actuate the timing mechanism. A preferred embodiment uses a magnet and a Hall effect sensor. Other electronic means include optical, ultrasound, or thermal sensing. The optical means encompasses a typical beam-breaking technology, while the ultrasound relies upon the reflected waves to trigger the event.

The simple electronic components are powered by a small battery, preferably lithium, for longer lasting duration. A further power source is gel pack batteries, wherein the smaller profile and longer lasting life would be a beneficial factor. Once again, the dispenser of the present embodiment does not require a power source to operate, and functions without any power applied to the unit. The power source is used for communicating the washing instructions, providing visual progress feedback, and recording and reporting number of usages.

An object of the invention is a tracking function for the number of usages in order for a supervisor to make an assessment of whether the employees are complying with the recommended guidelines. The number of usages also allows the supervisor to assess the dispenser as a teaching tool for assisting users in washing. The number of usages information is known only to the supervisor who resets the counter until the next inspection. The usage number is communicated by the dispenser aural output.

There are also means of using identification by the employee. The identification means includes entering an employee number or code number or PIN number. Alternatively, the employees could be issued RFID badges or name labels. This would serve as a tracking or monitoring mechanism for employers either voluntarily in order to reduce liability, or because of FDA regulations. Another embodiment encompasses a voice recognition means to detect an input voice cue. The users would have to have the voice input into the system, but once recorded, the identification of each user is possible. Technology has lowered the cost for such products while increasing reliability, ease of use and therefore compliance, and decreasing size and weight. The voice commands can be programmed to accept only certain commands and also to recognize an individual user's voice, thus automating the tracking process and eliminate the need for entering of a PIN or code number. Such an implementation should be easy to operate by the users. A further detection means for outputting a count and re-setting the counter is a magnetic means using the Hall effect sensors.

Another object includes using optical, infrared, magnetic, or ultrasonic sensing in a touchless or semi-automatic operation and actuation rather than a mechanical means to allow the convenience of touchless operation. Electronic switching means includes capacitive switching. An object of the invention is an optical and/or mechanical activation where the soap dispensing operation is driven by a motor or solenoid. The motor or solenoid can be either rotary or linear and automatically provide the sufficient force to meter out a liquid portion. In a preferred embodiment, a force of less than five pounds is required to dispense the liquid. Such force complies with the American Disabilities Act requirements. Current gear/cam devices provide this force with minimal consumption of power.

And yet an additional object is the design of the present invention as a throw away module or a field replaceable module depending on the manufacturing costs and the operating usage/environment. The package is most conveniently locatable in the dispenser housing and can snap into position on the lid for easy access.

An object of the invention is the manufacture and construction of dispensers that incorporate anti-microbial, anti-fungal and anti-bacterial plastics in the design. Although anti-microbial, anti-fungal and anti-bacterial plastics have been deployed in some applications, it has not been introduced into the dispenser industry. The generic name for the agent added to the ABS plastic is OBPA (Oxybisphenoxarsine). The use of anti-microbial/fungal/bacterial thermoplastics resists the growth of germs such as *E-Coli*, and reduces the transfer of such diseases. The wet environment of dispensers combined with the frequent use by many persons create a breeding ground for various forms of unwanted germs. The use of anti-microbial/fungal/bacterial plastics, such as poly-alpha BN and poly-alpha BN-K, provide a necessary step in preventing the spread of germs. Although the entire unit can be manufactured using this plastic, the most important component is the pushbar.

And yet another object of the invention is a dispenser for metering a liquid cleanser to a user and prompting the user in compliance with a recommended washing technique, comprising a container suitable for housing the liquid soap, a power source, a microcontroller connected to the power source, an actuation means, wherein the actuation means is triggered by the user and dispenses the liquid cleanser. Furthermore, the actuation means initiates a washing cycle containing a plurality of washing steps. There is a timer or timing means to count for the washing cycle, and a means of outputting a plurality of aural messages for instructing the user during each of the plurality of washing steps.

Another object is a dispenser wherein the actuation means is a Hall effect sensor attached to the dispenser and a magnet attached to a pushbar, wherein the sensor is actuated when the pushbar is operated.

Yet a further object is a dispenser wherein there are a plurality of washing step aural messages for each of the washing steps, and the washing step aural messages are randomly selected for outputting as the plurality of aural messages. Additionally, the plurality of aural messages can be in different languages.

An additional object is a dispenser further comprising a means of determining realtime clock data.

And, a further object is a dispenser further comprising a means of calculating a refill date and communicating the refill date.

An object includes a dispenser wherein the plurality of washing steps are lathering, scrubbing, and rinsing.

In addition, an object is a dispenser wherein the dispenser is manufactured using an Oxybisphenoxarsine (OBPA) agent. Also, a dispenser further comprising a pushbar containing an Oxybisphenoxarsine (OBPA) agent.

An object of the invention is a dispenser for metering a liquid cleanser to a user and prompting the user in compliance with a recommended washing technique, comprising an actuation means, wherein the actuation means is triggered by the user and dispenses the liquid cleanser, and wherein the actuation means initiates a washing cycle containing a plurality of washing steps. There is a timer to count for the washing cycle, and a visual means of indicating progress during the washing cycle. Also included is a means of outputting a plurality of aural messages for instructing the user during each of the plurality of washing steps, as well as a means of tracking a number of usages.

A further object includes a dispenser wherein the visual means is a plurality of light emitting diodes.

Additionally, an object is a dispenser further comprising a means of sensing a usage number request, wherein the number of usages is output as a verbal numeral.

In addition, an object is a dispenser further comprising a means of identifying the user by voice recognition. Also, an object is dispenser further comprising a means of identifying a supervisor by voice recognition.

Furthermore, an object is a dispenser further comprising a means of customizing the plurality of aural messages for instructing the user during each of the plurality of washing steps.

An object of the invention is a dispenser for metering a liquid cleanser to a user and prompting the user in compliance with a recommended washing technique, comprising a power source, and an actuation means, wherein the actuation means is triggered by the user and dispenses the liquid cleanser, and wherein the actuation means initiates a washing cycle containing a plurality of washing steps. Additionally, there is a means of outputting aural messages, and a visual display means for indicating progress of the recommended washing technique. Finally, there is a processing means for tracking a usage number, and timing of each of the aural messages and the visual display means, wherein the processing means is connected to the power source and the actuation means.

A related object includes a dispenser wherein the power source is a gel pack.

Another related object is a dispenser wherein the processing means is a microcontroller.

And, an object includes a dispenser further comprising a means of customizing the timing of each of the aural messages and the visual display means.

An object also includes a method for teaching proper hand washing using a dispenser, wherein the dispenser contains a processing means, wherein the processing means initiates a timed washing cycle containing a plurality of timed washing steps. The method comprising the steps of actuating a mechanism of dispensing a liquid cleanser from a user input, wherein the actuating commences the timed washing cycle. Outputting an instructional message during a first of the plurality of timed washing steps, and displaying a first progress indication. Outputting an instructional message during a second of the plurality of timed washing steps, and displaying a second progress indication. Outputting an instructional message during a third of the plurality of timed washing steps, and displaying a third progress indication. Finally, ending the timed washing cycle.

Finally, a last object is a system for teaching a user the proper method of hand washing, comprising the steps of starting a washing cycle containing a plurality of washing steps once an actuation means to dispense liquid cleanser has been manipulated, outputting a first aural instruction during a first washing step, illuminating a first visual display during a first washing step, outputting a second aural instruction during a second washing step, illuminating a second visual display during a second washing step, outputting a third aural instruction during a third washing step and illuminating a third visual display during a third washing step.

Other objects, features and advantages are apparent from description in conjunction with the accompanying drawings.

DESCRIPTION OF THE PREFERRED EMBODIMENT

Figure 1:
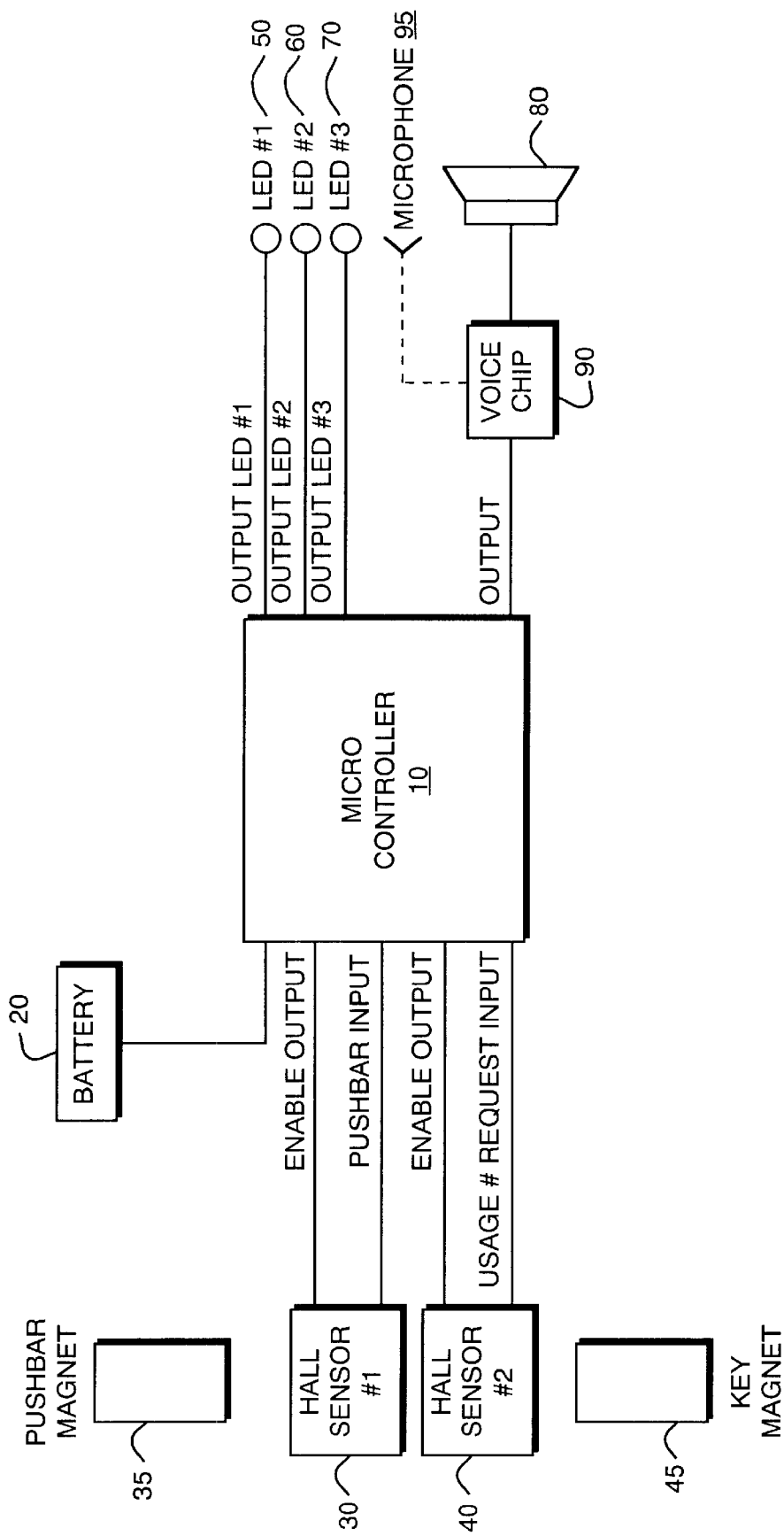
FIG. 1 is a basic block diagram of the dispenser system

As shown in FIG. 1, a microcontroller 10 is the processing center of the invention. The microcontroller 10 is powered in the preferred embodiment by a battery 20, although a direct electrical connection or photovoltaic energy source are possible. The system uses a 4.5 volt DC system, and any number of sources can produce this voltage, with varying costs and longevity. The power source/battery 20 in one embodiment is accomplished by using three AA cells in a battery box. Although these are shelf items, they require some room with the battery box. Other power sources include gel pack batteries which are more expensive and not off the shelf, but they last much longer and occupy a small profile. In addition, there would be no contact problems using gel packs such as those that occur with battery boxes.

In a preferred working embodiment, the implementations are controlled by an inexpensive microcontroller 10 such as the Microchip PIC16C505 device, chosen for the optimal cost/power consumption tradeoff. This microcontroller 10 responds directly to electrical or mechanical switch inputs from the sensing section. The microcontroller 10 uses a sleep mode to extend the battery 20, and the microcontroller 10 wakes up to run a 30 microsecond program every 100 milliseconds. If there is no actuation, the microcontroller 10 re-enters the sleep mode. If there is an actuation, the usage number is updated and the washing sequence is initiated. This embodiment achieves a duty cycle of only 1/3300 of fill power time to preserve battery life.

The overall timing duration, timing of individual steps, the number of steps, and the visual indicators are programmed in microcontroller 10 ROM. The voice instructions are also recorded in the microprocessor 10, but customization can be accomplished by using a voice chip 90 with RAM. For certain industries and applications the timing and steps can be adjusted accordingly to the specifics. One way of allowing customization of the timing, steps, and visual display is to provide a means for the user to burn the ROM. A kit can be provided to allow the user to reprogram the microcontroller 10 according to the specific requirements.

The microcontroller 10 can directly drive simple outputs such as tone modulated piezoelectric audio output devices or light emitting diodes (LED's), liquid crystal displays (LCD), and very low power D.C. motors. The microcontroller 10 also reads the sensors without any pre-amp, while debounce is accomplished by software. A simple power amplifier can be added to any of the plurality of output control line to accommodate higher power devices, and they can be driven directly. A simple conditioning circuit for debounce (may be a software feature), amplifier, level shift, or hysterisis can be added to any input line to enhance circuit performance.

The microcontroller 10 also has a number of programmable I/O pins available for additional functionality or jumpers. Such jumpers can be used to select among various languages of the recorded messages or similar option sets. Other features are also possible, including implementing a real time clock function. A high quality crystal oscillator with an accuracy in the vicinity of 0.0001% could be used for various realtime functions. The dispenser could come pre-programmed with the correct time and allow manual setting and adjustments. Alternatively, the signals from the atomic clock satellites could be received with communications circuitry similar to that employed on global positioning system (GPS) handsets. The clock presents the ability to feedback information such as what day a refill should be due or for scheduled maintenance, and verbally communicate the date to the supervisor.

In one embodiment the refill data can be approximated by tracking the total number of usages since last refill and multiplying by the metered output amount. Subtract that amount from the size of the liquid cleanser container. Take that number and divide by the metered output amount. This will provide the approximate number of usages remaining until the cleanser container is empty. Dividing the number of usages remaining by the average number of usages per day will give the number of days remaining till the container is empty. With the real time clock, the information can be communicated by date and time of expected refill when the supervisor retrieves the usage number. The clock would also make the management aspect more effective by indicating the usage number over a specific time period. A relative measurement of number of days remaining without the clock still provides useful information to the supervisor and can be processed and communicated. A further embodiment simply divides the refill amount by the metered output amount and calculates the number of expected usages. The dispenser can then track the remaining liquid cleanser by the number of usages and alert the supervisor when there are a low level of usages remaining. Such alert may be audio output or by visual display means.

The microcontroller 10 handles the sensors 30, 40, performs the timing, tailors the particular LED feedback 50,60, 70, keeps the dispenser usage number, and outputs audio information to a voice chip 90. The voice chip 90 in one embodiment is a ROM version that is factory programmed. The most cost-effective version of the dispenser is via factory-programmed microprocessor 10 ROM for the voice instructions. Such voice instructions can be of animated characters, celebrities, and in different languages, or to simulate changing messages by having a number of possible scripts for each segment of the voiced output that is coupled with a random selection process to produce a large number of possible messages. For example, three different sets of instructions can be recorded for each of the steps of lathering, scrubbing, and rinsing-allowing 27 totally unique messages. There is sufficient ROM memory for multiple messages for each washing step as well as different languages that can be burned into ROM for specific industries or randomly applied within each stage or selected via the extra I/O pins on the microprocessor 10.

An alternative embodiment uses a voice integrated circuit 90 with RAM and a microphone 95 for customization and programmability. The customization or recording of any voice instruction is accomplished through a simple and inexpensive option that can be installed in the dispenser or as a separate kit. A microphone 95 is installed within the dispenser housing and accessible through holes in the housing or as a separate plug in unit. When an initiation sequence is given, the user records a personalized set of messages for each washing step. The customization option of recording personalized messages provides flexibility of customizing the messages to increase compliance.

The present invention uses Hall effect sensors 30, 40 in a preferred embodiment, wherein Hall effect sensors operate when the encounter a magnetic source. A first Hall sensor 30 is electrically connected to the microcontroller 10 and mounted on the inner surface of the dispenser nearby the actuating pushbar. The actuating magnet 35 is mounted on the dispenser actuating pushbar. In operation, as a user operates the pushbar, the magnet 35 enters in close proximity to the Hall sensor 30 and triggers the circuit. The Hall effect sensors of the preferred embodiment are HAL 504UA components, which are chosen or their individual characteristics.

The sensor 30 has two I/O signals, namely an Enable output signal and a Pushbar Request input signal. The microcontroller 10 cycles during operation from a typical sleep mode to a wakeup state. At the wakeup state, the microcontroller 10 enables the Hall effect sensor 30 to determine if the pushbar has been actuated such that the magnet 35 came in close proximity to the sensor 30. If the sensor 30 has been actuated, the microcontroller 10 starts the timing cycle, the voice instructions and the visual displays as well as increment the usage number.

In one embodiment, a second Hall sensor 40 is mounted internal to the dispenser. This Hall sensor 40 is used by a supervisor or maintenance personnel and not by the general public. A key magnet 45 would be in the possession of the supervisor or maintenance person and used to extract usage number data from the dispenser and also to re-set the usage indicator. In a preferred embodiment, the usage number is verbally provided to the supervisor. The Hall effect sensors are standard off the shelf items; however magnetic reed switches for sensing is also within the scope of the invention. Hall effect sensors with polarity settings are also possible means for distinguishing between pushbar requests and usage number requests or clear requests.

Although two sensors are utilized in this description, a further refinement of the invention can accomplish the same functionality using a single sensor. In the single sensor operation, the microcontroller 10 would consider the pushbar actuation of less than two seconds to be a normal dispenser request. If the pushbar were held in place for six to eight seconds, the microcontroller 10 would consider this to be a supervisor request for the usage number and output the usage number. If the pushbar is held in place for fifteen to twenty seconds, the current usage number would be cleared and the clear signal would be communicated to the user.

A speaker 80 is connected to a voice circuit 90 which connects to the microcontroller 10 and delivers audio output such as tones, music or voice instructions. The pushbar request audio output is voice instructions on proper washing. The audio output data is stored in memory on the microcontroller 10, although customization of the voice data is possible. In the preferred embodiment the speaker 80 is a 1.75" standard moving voice coil type. The speaker 80 is also used to output the usage number to the supervisor and to issue the 'clear' comment after the usage number is cleared.

There are a plurality of LED's 50, 60, 70 connected to the microcontroller 10 to provide visual signals to the user as to the start and stop of the washing cycle. In addition, the LED's are used to display the progress of the washing cycle. In the preferred embodiment, the lather signal LED 50 is red, the washing cycle LED 60 is yellow and the end LED 70 is green. Other colors and combinations are possible. The microcontroller 10 can be programmed to illuminate the LED's by flashing in order to designate the washing sequence. The LED's are chosen from a wide variety for color, power and intensity tradeoffs.

Figure 2:
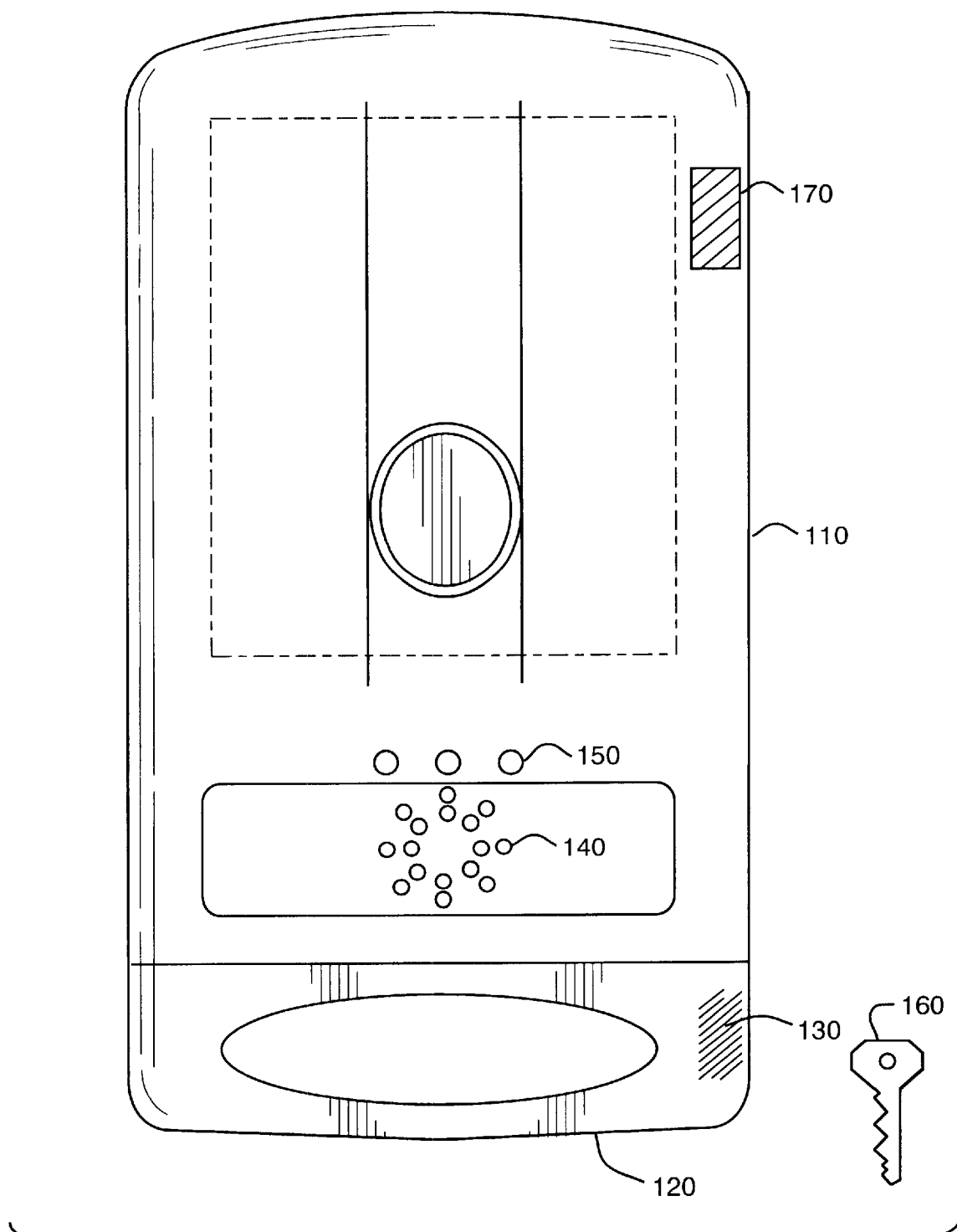
FIG. 2 shows the physical layout of the invention, front perspective

FIG. 2 illustrates the physical layout of an embodiment of the invention. The dispenser 100 encompasses and outer shell 110 and a pushbar 120. A Hall sensor 130 is mounted internally on the dispenser shell 110 with a coordinated magnet mounted on the actuating bar. The Hall sensor 130 and the magnet are mounted such that as the user engages the pushbar 120, the magnet comes in close proximity to the Hall sensor 130 and initiates the start of the washing cycle.

A magnetic key 160 is used to activate a second Hall sensor 170 that provides the supervisor access to the usage number and to clear the usage number. If the magnetic key 160 is held close to the second Hall sensor 170, the usage number will be communicated via audio output. Maintaining the magnetic key 160 near the sensor 170 clears the usage number.

A speaker 140 is mounted above the actuating bar 120, with holes to allow the sound to carry. The speaker 140 provides the voice commands and any other audio output. In the preferred embodiment the audio output consists of voice instructions on washing hands. The voice commands are stored into memory of the microcontroller 10.

A plurality of LED's 150 are mounted on the dispenser 10 so that they are optimally visible to the users of the dispenser 100. The LED's 150 of the preferred embodiment are green, yellow and red and are actuated according to the microcontroller 10.

The dispenser 100 of the preferred embodiment utilizes anti-bacterial plastic in the dispenser construction to reduce the amount of contaminants residing on the dispenser 100. The anti-bacterial plastic is used on the entire dispenser housing, but is most particularly important to the elements that normally receive user contact such as the actuating pushbar in the non-automated versions. There are several anti-microbial plastics, including Poly-alpha BN, Poly-alpha BN-K, and Microban. Poly-alpha BN, Poly-alpha BN-K are organic agents that are nontoxic and transparent, although BN-K is intended for special transparencies. The main composition of the Poly-alpha BN and BN-K is from the sorbic acid group.

The plastic incorporating an oxybisphenoxarsine (OBPA) agent is designed to be durable and effective resisting the growth of bacteria, fungi, and mold. It inhibits the growth of these microorganisms by utilizing an electrochemical action that disrupts the normal cell functions. Incorporating the OBPA agent into the plastic does not alter the strength or color of the plastic and is benign to normal human usage. While the plastics with the OBPA agents are known in certain industries, the application of the OBPA plastic on dispensers 100 has not been done.

Using the OBPA plastic on the actuating push bar reduces the likelihood of being contaminated from touching the dispenser. The OBPA is incorporated into manufacturing process, becomes part of the product, and typically lasts the lifetime of the product. The OBPA plastic has the same properties as regular plastic, and is still amenable to injection molding, blow molding and the standard molding processes, and unlike surface coatings it does not wear off. Thus, the manual dispensers are a viable option for safe and effective delivery unit, and the expensive touchless dispensers become less important.

Figure 3:
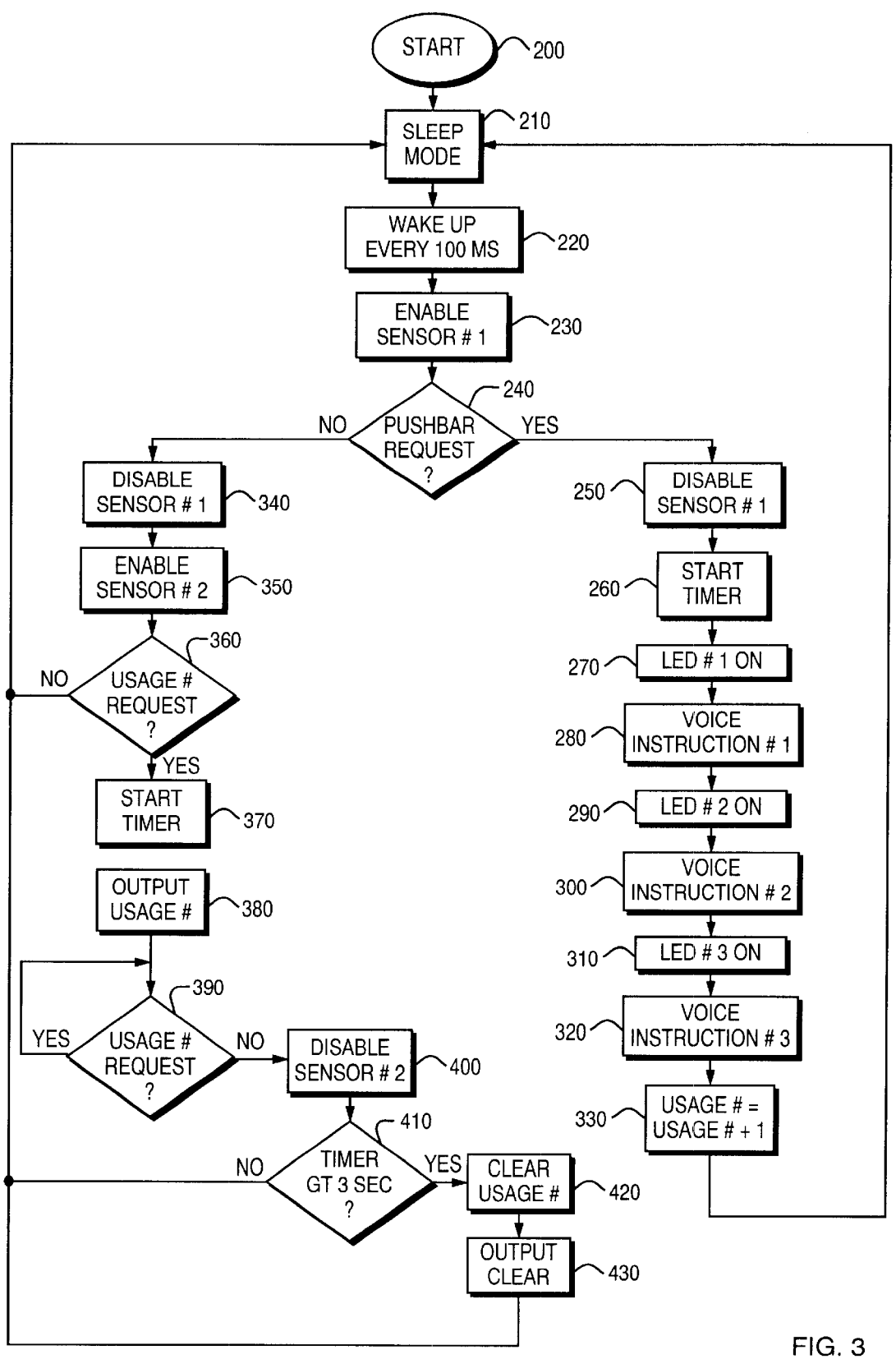
FIG. 3 shows a flowchart of the instruction set and timing

A flowchart of the steps of the present invention are shown in FIG. 3. The sequence is started 200 when the batteries 20 are installed or otherwise power is initiated. The microcontroller 10 is normally in sleep mode 210, but runs a simple program that wakes up every 100 msecs 220. The microcontroller 10 enables the Hall effect sensor #1 30 by sending power to the sensor 30 and reading the pushbar input line to see if the pushbar has been actuated 240.

If the pushbar has been actuated, the sensor 30 is disabled to preserve power 250. Subsequent pushbar actuation will not be detected. The microcontroller 10 begins the handwash sequence by starting the timer 260, turning on the first LED 50 (270) and selecting the first voice instruction 280. The first message is given after the user has retrieved a metered portion of soap, and can be something such as: "Wet hands and lather soap in hands, going up exposed forearms if possible." During the interim between all instructions, additional messages, tones, or music can be played to keep the user amused and washing.

The first LED 50 is red in the preferred embodiment and is illuminated during the entire lathering cycle. The LED's may be flashing or steady during each of the cycles-and can even be randomized. After eight seconds of lathering, the second LED 60 is illuminated 290, and is yellow in the preferred embodiment. The first LED 50 can be extinguished at this point or remain on until the entire cycle is completed. The next voice message 300 tells the user to "Scrub hands vigorously", followed by "Be sure to wash between fingers and underneath fingernails".

After seven seconds of scrubbing, the third LED 70, green in the preferred embodiment, is illuminated 310, with the final voice message 320. The final message should be something such as "Rinse your hands and remove all soap. Be sure to dry your hands properly." The last message should last no longer than five seconds. After five seconds, audio output should stop and all the LED's turned off The usage counter is incremented by one 330 and the microcontroller returns to the sleep state 210.

If the pushbar request was negative 240, the sensor #1 30 is disabled 340, while the sensor #2 40 is enabled 350. The microcontroller 10 reads the usage number input line to determine if the supervisor has requested the usage number 360. If the sensor #2 40 has been actuated by the key magnet 45, the timer is started 370. The microcontroller 10 outputs the usage number to the voice chip 90 which transmits the audio signal to the speaker 80 and outputs a verbal usage number 380.

The microcontroller 10 then checks if the key magnet 45 is still in place on the sensor #2 40, and whether the usage request is still active 390. If the supervisor continues to hold the key magnet near the sensor #2, the usage request is active and the processing continues until the supervisor removes the key magnet 45. Once the usage request is inactive, the sensor #2 40 is disabled 400. The timer is checked to see if it is greater than three seconds 410, and if not greater than three seconds, the microcontroller 10 returns to sleep mode. If the timer is greater than three seconds, the usage counter is cleared 420 and the verbal 'clear' command is output to the supervisor 430. The process then returns to the sleep mode 210.

The foregoing description of the preferred embodiment of the invention has been presented for the purpose of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto. The invention is susceptible of many variations, all within the scope of the specification, figures, and claims. The preferred embodiment described herein and illustrated in the figures should not be construed as in any way limiting.

What is claimed is:

1. A dispenser for metering a liquid cleanser to a user and prompting said user in compliance with a recommended washing technique, comprising:

a container suitable for housing said liquid cleanser;

a power source;

a microcontroller connected to said power source;

an actuation means, wherein said actuation means is triggered by said user and dispenses said liquid cleanser, and wherein said actuation means initiates a washing cycle containing a plurality of washing steps;

a means for timing said washing cycle; and a voice chip operatively connected to said microcontroller, wherein said voice chip output a plurality of aural instructional messages through a speaker for instructing said user during each of said plurality of washing steps.

2. A dispenser according to claim 1, wherein said actuation means is a Hall effect sensor attached to said dispenser and a magnet attached to a pushbar, wherein said sensor is actuated when said pushbar is operated.

3. A dispenser according to claim 1, wherein there are a plurality of washing step instructional messages for each of said washing steps, and said washing step instructional messages are randomly selected for outputting as said plurality of instructional messages.

4. A dispenser according to claim 1, wherein said plurality of instructional messages are in different languages.

5. A dispenser according to claim 1, further comprising a means for determining realtime clock data, wherein said realtime clock data is obtained using communications circuitry.

6. A dispenser according to claim 1, further comprising a means for calculating a refill date and communicating said refill date.

7. A dispenser according to claim 1, wherein said plurality of washing steps are lathering, scrubbing, and rinsing.

8. A dispenser according to claim 1, wherein said dispenser is manufactured using an Oxybisphenoxarsine (OBPA) agent.

9. A dispenser according to claim 1, further comprising a pushbar containing an Oxybisphenoxarsine (OBPA) agent.

10. A dispenser for metering a liquid cleanser to a user and prompting said user in compliance with a recommended washing technique, comprising:

a container suitable for housing said liquid cleanser;

a power source;

a microcontroller connected to said power source;

an actuation means, wherein said actuation means is triggered by said user and dispenses said liquid cleanser, and wherein said actuation means initiates a washing cycle containing a plurality of washing steps;

a means for timing said washing cycle;

a means for indicating progress during said washing cycle;

a means for outputting a plurality of aural instructional messages for instructing said user during each of said plurality of washing steps; and a means for tracking a number of usages.

11. A dispenser according to claim 10, wherein said means for indicating progress is a plurality of light emitting diodes.

12. A dispenser according to claim 10, further comprising a means for sensing a usage number request, wherein said number of usages is output as a verbal numeral.

13. A dispenser according to claim 10, further comprising a means for identifying a supervisor by voice recognition.

14. A dispenser according to claim 10, further comprising a means for customizing said plurality of instructional messages for instructing said user during each of said plurality of washing steps.

15. A dispenser according to claim 10, further comprising a means for timing of each of said instructional messages and said means of indicating progress.

16. A dispenser according to claim 10, wherein said power source is a gel pack.

17. A method for teaching proper hand washing using a soap dispenser, wherein said soap dispenser contains a processing means, wherein said processing means initiates a timed washing cycle containing a plurality of timed washing steps, said method comprising the steps of:

dispensing a liquid cleanser upon a user actuating a dispensing mechanism, wherein said actuating commences said timed washing cycle;

outputting a first aural instructional message during a first of said plurality of timed washing steps;

displaying a first progress indication;

outputting a second aural instructional message during a second of said plurality of timed washing steps;

displaying a second progress indication;

outputting a third aural instructional message during a third of said plurality of timed washing steps;

displaying a third progress indication; and ending said timed washing cycle.

* * * * *

UNITED STATES PATENT AND TRADEMARK OFFICE
CERTIFICATE OF CORRECTION

PATENT NO.   : 6,375,038 B1
DATED        : April 23, 2002
INVENTOR(S)  : Daansen et al.

It is certified that error appears in the above-identified patent and that said Letters Patent is hereby corrected as shown below:

<u>Title page,</u>
Item [56],
| | | |
|---|---|---|
| Insert -- 5,625,659 | Sears | 04-1997 -- |
| Insert -- 5,370,267 | Schroeder | 12-1994 -- |
| Insert -- 5,771,925 | Lewandowski | 06-1998 -- |
| Insert -- 5,611,465 | Lee et al. | 03-1997 -- |
| Insert -- 5,793,653 | Segal | 08-1998 -- |
| Insert -- 5,765,242 | Marciano | 06-1998 -- |
| Insert -- 5,945,910 | Gorra | 08-1999 -- |
| Insert -- 5,810,201 | Besse et al. | 09-1998 -- |

Signed and Sealed this

Eleventh Day of March, 2003

JAMES E. ROGAN
*Director of the United States Patent and Trademark Office*